United States Patent
Heath

(10) Patent No.: US 12,269,454 B1
(45) Date of Patent: Apr. 8, 2025

(54) AFTERMARKET HYBRID CONVERSION SYSTEM FOR VEHICLES

(71) Applicant: Finn Heath, Renton, WA (US)

(72) Inventor: Finn Heath, Renton, WA (US)

( * ) Notice: Subject to any disclaimer, the term of this patent is extended or adjusted under 35 U.S.C. 154(b) by 0 days.

(21) Appl. No.: 18/938,792

(22) Filed: Nov. 6, 2024

(51) Int. Cl.
| | |
|---|---|
| *B60W 20/10* | (2016.01) |
| *B60W 30/18* | (2012.01) |
| *B60W 50/10* | (2012.01) |

(52) U.S. Cl.
CPC ...... *B60W 20/10* (2013.01); *B60W 30/18127* (2013.01); *B60W 50/10* (2013.01)

(58) Field of Classification Search
None
See application file for complete search history.

(56) References Cited

U.S. PATENT DOCUMENTS

| | | | | |
|---|---|---|---|---|
| 5,678,646 A * | 10/1997 | Fliege | ...... | H02K 9/19 310/112 |
| 6,332,257 B1 * | 12/2001 | Reed, Jr. | ...... | B60L 15/2009 903/952 |
| 7,271,555 B1 * | 9/2007 | Ciccone | ...... | B60K 6/365 180/247 |
| 7,628,236 B1 * | 12/2009 | Brown | ...... | B60K 6/48 180/65.21 |
| 7,681,676 B2 * | 3/2010 | Kydd | ...... | B60K 6/48 180/65.21 |
| 8,011,461 B2 * | 9/2011 | Rodriguez | ...... | B60L 50/40 477/3 |
| 8,376,068 B2 * | 2/2013 | Vargas | ...... | B60L 7/10 180/56 |
| 8,423,214 B2 * | 4/2013 | Kshatriya | ...... | B60K 6/485 180/65.21 |
| 8,453,772 B2 * | 6/2013 | Brown | ...... | B60L 58/13 180/65.285 |
| 8,596,391 B2 * | 12/2013 | Kshatriya | ...... | B60W 20/00 29/401.1 |
| 8,781,661 B2 * | 7/2014 | Gunther | ...... | B60K 6/48 701/33.2 |
| 9,308,810 B1 * | 4/2016 | Kurdy | ...... | B60K 7/00 |
| 9,457,792 B2 * | 10/2016 | Bradley | ...... | B60K 6/547 |

(Continued)

*Primary Examiner* — Jonathan M Dager
(74) *Attorney, Agent, or Firm* — Gugliotta & Gugliotta LPA

(57) ABSTRACT

An aftermarket hybrid conversion system enables retrofitting existing combustion engine vehicles with electric assist capabilities. The system includes a variable speed electric motor with regenerative braking, coupled to the vehicle's drive shaft through a power input gearbox and torque converter. An energy storage system combines lithium polymer batteries and supercapacitors in parallel configuration, charged through regenerative braking and the vehicle's alternator. Steering wheel-mounted paddle shifters provide user control, with the left paddle engaging regenerative braking and the right paddle controlling electric assist power. An electrical controller manages power flow, implements safety protocols, and synchronizes motor operation. The system provides supplemental torque equivalent to the original engine's output while capturing otherwise wasted braking energy. Adaptable to various vehicle types from classic cars to heavy haul trucks, the system enhances performance and efficiency without requiring extensive vehicle modifications or compromising original drivetrain integrity.

20 Claims, 3 Drawing Sheets

(56) References Cited

U.S. PATENT DOCUMENTS

| | | | |
|---|---|---|---|
| 9,669,698 B2* | 6/2017 | Crecelius | B60K 6/40 |
| 10,173,663 B1 | 1/2019 | Combs | |
| 10,479,184 B2* | 11/2019 | Matheson | B60K 6/48 |
| 10,946,739 B2* | 3/2021 | Pursifull | B62D 5/063 |
| 11,351,850 B1* | 6/2022 | Calandruccio | B60K 1/00 |
| 11,390,163 B2* | 7/2022 | Galang | B60K 7/0007 |
| 11,524,672 B2* | 12/2022 | Moreland | B60K 6/485 |
| 11,958,352 B1* | 4/2024 | Sweere | H01M 8/04029 |
| 2004/0188154 A1* | 9/2004 | Carlson | B60K 6/32 180/65.25 |
| 2004/0204797 A1* | 10/2004 | Vickers | B60W 50/0097 701/1 |
| 2005/0205313 A1* | 9/2005 | Gilmore | B60K 17/22 180/65.21 |
| 2006/0000650 A1* | 1/2006 | Hughey | B60L 7/12 180/65.25 |
| 2006/0030450 A1* | 2/2006 | Kyle | B60L 50/16 477/3 |
| 2006/0108161 A1* | 5/2006 | Feliss | B60K 6/52 180/65.285 |
| 2007/0163819 A1* | 7/2007 | Richter | B60L 3/0038 180/65.245 |
| 2007/0169723 A1* | 7/2007 | Rutledge | B60K 6/48 123/3 |
| 2007/0169970 A1* | 7/2007 | Kydd | B60L 50/16 903/903 |
| 2008/0236910 A1* | 10/2008 | Kejha | B60W 30/18145 180/265 |
| 2008/0308328 A1* | 12/2008 | Kejha | B60L 15/2045 180/243 |
| 2009/0103341 A1* | 4/2009 | Lee | B60W 10/26 320/140 |
| 2009/0127008 A1* | 5/2009 | Batdorf | B60K 6/48 29/401.1 |
| 2009/0223725 A1* | 9/2009 | Rodriguez | B60L 7/14 180/65.21 |
| 2009/0321155 A1* | 12/2009 | Vargas | B60K 6/46 180/62 |
| 2010/0044129 A1* | 2/2010 | Kyle | B60L 7/18 180/65.21 |
| 2010/0104894 A1 | 4/2010 | Lee et al. | |
| 2011/0079454 A1* | 4/2011 | Maguire | B60L 58/21 180/65.21 |
| 2013/0091694 A1* | 4/2013 | Hussain | B60L 50/16 180/65.265 |
| 2017/0029054 A1* | 2/2017 | Woodward | B60K 6/485 |
| 2022/0063416 A1 | 3/2022 | Nahar | |
| 2022/0149698 A1 | 5/2022 | Salvaryan | |
| 2022/0412328 A1 | 12/2022 | Salvaryan | |
| 2023/0211691 A1 | 7/2023 | Cronin | |
| 2023/0299609 A1 | 9/2023 | Wu et al. | |
| 2024/0021923 A1 | 1/2024 | Lee et al. | |
| 2024/0025422 A1 | 1/2024 | Tu et al. | |
| 2024/0051433 A1 | 2/2024 | Lee et al. | |

* cited by examiner

AFTERMARKET HYBRID CONVERSION SYSTEM FOR VEHICLES

CROSS-REFERENCE TO RELATED APPLICATIONS

There are no previously filed, nor currently any co-pending applications, anywhere in the world.

BACKGROUND OF THE INVENTION

1. Field of the Invention

The present invention relates to aftermarket vehicle modification systems for retrofitting existing combustion engine vehicles with hybrid electric assist capabilities, particularly to systems that combine regenerative braking and power enhancement features without requiring extensive vehicle modifications.

2. Description of the Related Art

Traditional approaches to enhancing vehicle performance and efficiency have primarily focused on factory-installed hybrid systems or conventional engine modifications. While hybrid technology has advanced significantly, its implementation has been largely limited to new vehicle manufacturing rather than aftermarket solutions. Current methods for improving existing vehicle performance typically involve turbocharging, engine replacements, or complete vehicle overhauls, all of which can be invasive, expensive, and potentially damaging to the original drivetrain.

In the heavy-haul transportation sector, vehicles face particular challenges with hill climbing and braking efficiency. Conventional braking systems convert kinetic energy to heat, effectively wasting energy that could potentially be recovered. While regenerative braking technology exists in modern hybrid vehicles, retrofitting such systems to existing vehicles presents significant technical challenges.

The aftermarket modification industry has attempted to address these issues through various approaches. For example, U.S. Pat. No. 6,886,848 demonstrates the use of hybrid components in vehicles, and U.S. Patent Application Publication No. 2014/0062064 describes certain electric motor implementations. However, these solutions generally require extensive vehicle modifications or are integrated into new vehicle designs rather than offering practical aftermarket solutions.

Several persistent problems exist in the current state of the art:
a) Traditional performance enhancement methods often stress existing drivetrains, potentially compromising vehicle reliability and longevity;
b) Existing hybrid conversion solutions typically require extensive vehicle modifications, making them impractical for many applications;
c) Current systems fail to effectively capture and reuse braking energy in aftermarket applications;
d) Available solutions often lack user control over power assistance and energy recovery;
e) Most hybrid systems are designed for specific vehicle types, limiting their adaptability across different platforms; and
f) The cost and complexity of existing solutions make them impractical for many vehicle owners, particularly in the classic car and commercial vehicle sectors.

These limitations have created a need for an aftermarket hybrid conversion system that can enhance vehicle performance without requiring extensive modifications, while providing effective energy recovery and user control. Particularly, there is a need for a solution that can be adapted to various vehicle types, from classic cars to heavy-haul trucks, while maintaining the integrity of the original vehicle design.

The present invention addresses these needs by providing a novel approach to vehicle hybridization through an aftermarket modification system that combines power enhancement capabilities with regenerative braking, using innovative power storage and control mechanisms.

SUMMARY OF THE INVENTION

It is thus a primary object of the present invention to provide an aftermarket hybrid conversion system that enhances vehicle performance without requiring extensive modifications to existing vehicles.

It is another object of the present invention to provide a retrofit system that effectively doubles a vehicle's available power through the addition of an electric assist motor coupled directly to the drive shaft.

It is a further object of the present invention to provide an energy recovery system that captures and stores braking energy through a combination of lithium polymer batteries and supercapacitors.

It is still another object of the present invention to provide a user-controlled power assistance system through steering wheel-mounted paddle shifters that allows strategic deployment of electric assist and regenerative braking capabilities.

It is yet another object of the present invention to provide a versatile hybrid conversion system that can be adapted to various vehicle types, from classic cars to heavy-haul trucks.

It is an additional object of the present invention to provide a performance enhancement solution that maintains the integrity of the original vehicle drivetrain while improving efficiency and power output.

It is a further object of the present invention to provide an integrated control system with automatic safety overrides to ensure safe operation and protect vehicle components.

It is still another object of the present invention to provide an economical alternative to traditional performance enhancement methods such as engine replacement or complete vehicle overhaul.

It is still a further object of the present invention to provide a method of disabling all cell phones which are moving without requiring special cell phones to do so in a particular geographical region.

The present invention provides an innovative aftermarket modification system that converts existing combustion engine vehicles into hybrid vehicles through a retrofit process. At its core, the system comprises an electric assist motor that connects directly to the vehicle's drive shaft, working in conjunction with a power pack that uniquely combines lithium polymer (LiPo) batteries and supercapacitors. A regenerative braking system, controlled through steering wheel-mounted paddle shifters and managed by an electronic control module with integrated safety overrides, completes the primary architecture. The system functions by providing supplemental torque equal to the combustion engine's output, effectively doubling the vehicle's total power. The left paddle shifter engages regenerative braking, capturing energy that would otherwise be lost and storing it in the supercapacitors, while the right paddle shifter controls electric assist power. During normal operation, the vehicle's alternator charges the LiPo batteries, ensuring continuous power availability. This configuration delivers significant benefits, including doubled power output and improved performance without stressing the existing drivetrain, while enhancing efficiency through energy recovery. The system's direct drive shaft coupling method, combined with its novel power storage solution and variable paddle shifter control system, represents a less invasive approach compared to traditional engine replacements. Furthermore, its adaptability to various vehicles, from classic cars to heavy haul trucks, makes it particularly valuable for classic car owners and commercial fleet operators seeking to enhance performance and efficiency without compromising their vehicles' integrity.

It is an advantage of the present invention that it provides a non-invasive method of retrofitting existing vehicles with hybrid capabilities without requiring major modifications to the original vehicle architecture.

It is another advantage of the present invention that it effectively doubles the vehicle's available power output through the addition of an electric assist motor that matches the original engine's torque.

It is an advantage of the present invention that it captures and stores braking energy that would otherwise be lost as heat through its regenerative braking system.

It is another advantage of the present invention that it combines lithium polymer batteries and supercapacitors to optimize both energy storage capacity and rapid power delivery capabilities.

It is an advantage of the present invention that it provides user-controlled power assistance through steering wheel-mounted paddle shifters, allowing strategic deployment of electric assist and regenerative braking.

It is another advantage of the present invention that it incorporates automatic safety overrides to prevent unsafe operation and protect the vehicle's drivetrain.

It is an advantage of the present invention that it can be adapted to a wide range of vehicle types, from classic cars to heavy-haul trucks, while maintaining a consistent core architecture.

It is another advantage of the present invention that it enhances hill climbing ability and braking efficiency, particularly beneficial for heavy-haul transportation applications.

It is an advantage of the present invention that it provides improved vehicle efficiency and range through the strategic use of stored electrical energy.

It is another advantage of the present invention that it offers a more economical alternative to traditional performance enhancement methods such as engine replacement or complete vehicle overhaul.

It is an advantage of the present invention that it allows for variable power assistance levels based on user input and driving conditions.

It is another advantage of the present invention that it maintains the original vehicle's mechanical integrity while providing modern hybrid capabilities.

It is an advantage of the present invention that it can operate transparently with the vehicle's existing controls while providing additional user-selectable enhancement features.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Figure 1:
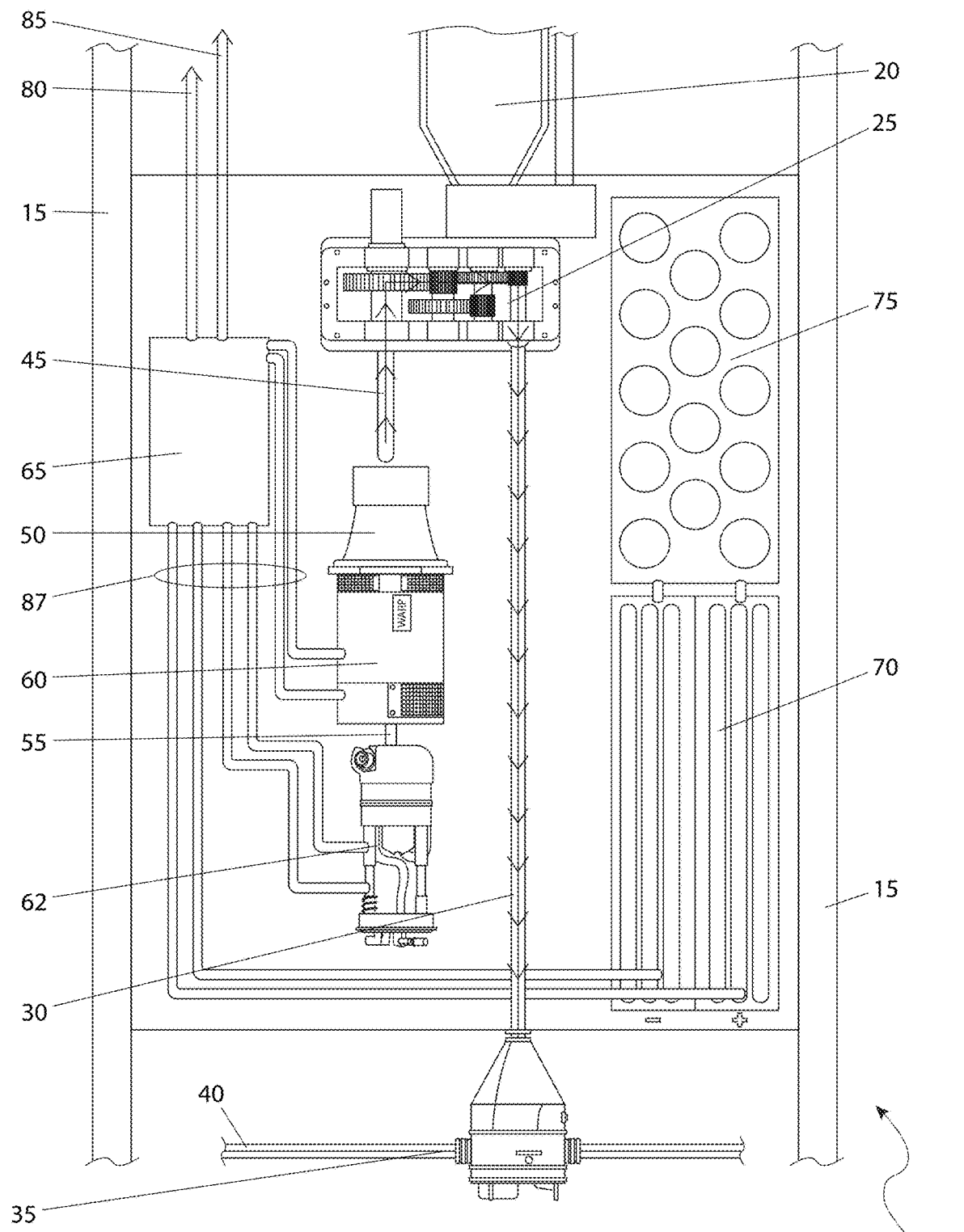
FIG. 1 is a cutaway view of a retrofit regenerative braking system 10, installed on a vehicle 15, according to the preferred embodiment of the present invention.

Referring now to the drawings, wherein like reference numerals indicate the same parts throughout the several views, Referring now to FIG. 1, a cutaway view of a retrofit regenerative braking system 10 installed on a vehicle 15, according to the preferred embodiment of the present invention is disclosed. The retrofit regenerative braking system (herein also described as the "system") 10, provides a method by which existing motor vehicles 15 can be equipped with an on-board system 10 that captures regenerative braking power and uses it to improve performance and efficiency. The system 10 can be adapted to any type of existing vehicle 15 (herein depicted as a frame for purposes of illustration), typically powered by an internal combustion engine 60, including but not limited to passenger vehicle, trucks, heavy haul transport trucks, recreational vehicles, emergency vehicles, construction vehicles, and the like. As such, the use of the system 10 on any particular type of vehicle 15 is not intended to be a limiting factor of the present invention.

A transmission 20 provides rotational energy in a conventional manner. The output of the transmission 20 is routed to a power input gearbox 25. The power input gearbox 25 is envisioned to be similar in design to an industrial grade (heavy duty) secondary four-by-four (4×4) power take off (PTO) gearbox specifically designed for the vehicle 15 and/or transmission 20 upon which it is used. In an alternate embodiment a PTO from a conventional transmission 20 could also be utilized. A passenger vehicle 15 would generally be smaller in physical size, while larger vehicle 15, such as heavy-haul vehicles would be larger in size. A first transmission output 30 is routed to a differential 35 and a drive axle 40 in a conventional manner. A second bi-directional transmission output 45 is then routed to an torque converter 50.

The torque converter 50 is similar to those found in an automatic transmission in that it would allow for a non-rigid coupling of the two (2) power sources to avoid damage and increase safety. The torque converter 50 is directly coupled to a variable speed electric motor with regenerative braking 60 such as a "Warp 11" with approximately one-hundred-pounds (135 lbs.). Other motor/generators with regenerative braking could also be used and as such, the use of any specific variable speed electric motor with regenerative braking 60 should not be interpreted as a limiting factor of the system 10. A bi-directional rotational power shaft 55 is routed from the variable speed electric motor with regenerative braking 60 to an additional motor 62 for instances where additional power is needed for larger applications such as a truck, an off-road construction vehicle, a high performance application, or the like. The inclusion or deletion of the additional motor 62 as well as the bi-directional rotational power shaft 55 is not intended to be a limiting factor of the system 10.

The electrical connection from the variable speed electric motor with regenerative braking 60, as well as the additional motor 62 if provided, is routed to an electrical controller 65. For the purposes of electrical power storage, power is routed in a parallel connection to a lithium polymer battery pack 70 and a supercapacitor 75. The battery pack 70 is envisioned to be made with the highest-grade batteries available, and with the largest capacity that can fit the physical space available. The supercapacitor 75 would also be made with the highest grade, state-of-the-art, capacitors with a larger instantaneous capacity of the battery pack 70 that would also fit the physical space available. Both the battery pack 70 and the supercapacitor 75 would be custom made to fit within the confines of the space available on the specific vehicle 15. The electrical controller 65 serves as a controller interface for the variable speed electric motor with regenerative braking 60, as well as the additional motor 62 if provided, the battery pack 70, the paddle shift controller 80, and a visual indicator screen 85. Both the paddle shift controller 80 and the visual indicator screen 85 will be located in the passenger compartment of the equipped vehicle 15 as will be shown herein below. The electrical controller 65 provides the following functionality via controlling:

Safety overrides.
Variable speed electric motor with regenerative braking 60, as well as the additional motor 62 if provided, variability.
Lock up engagement.
Battery levels and management.
Autopilot to allow trickle power output for a long period to use for better efficiency.
Synchronizing the variable speed electric motor with regenerative braking 60, as well as the additional motor 62 if provided, with an "rpm" sensor for engagement.
Start delays to avoid damage due to directional change.
Means of motor 60, as well as the additional motor 62 if provided, engagement to allow for synchronization with output of the first transmission output 30.

The above electrical connections are accomplished by wiring 87 as shown.

Figure 2:
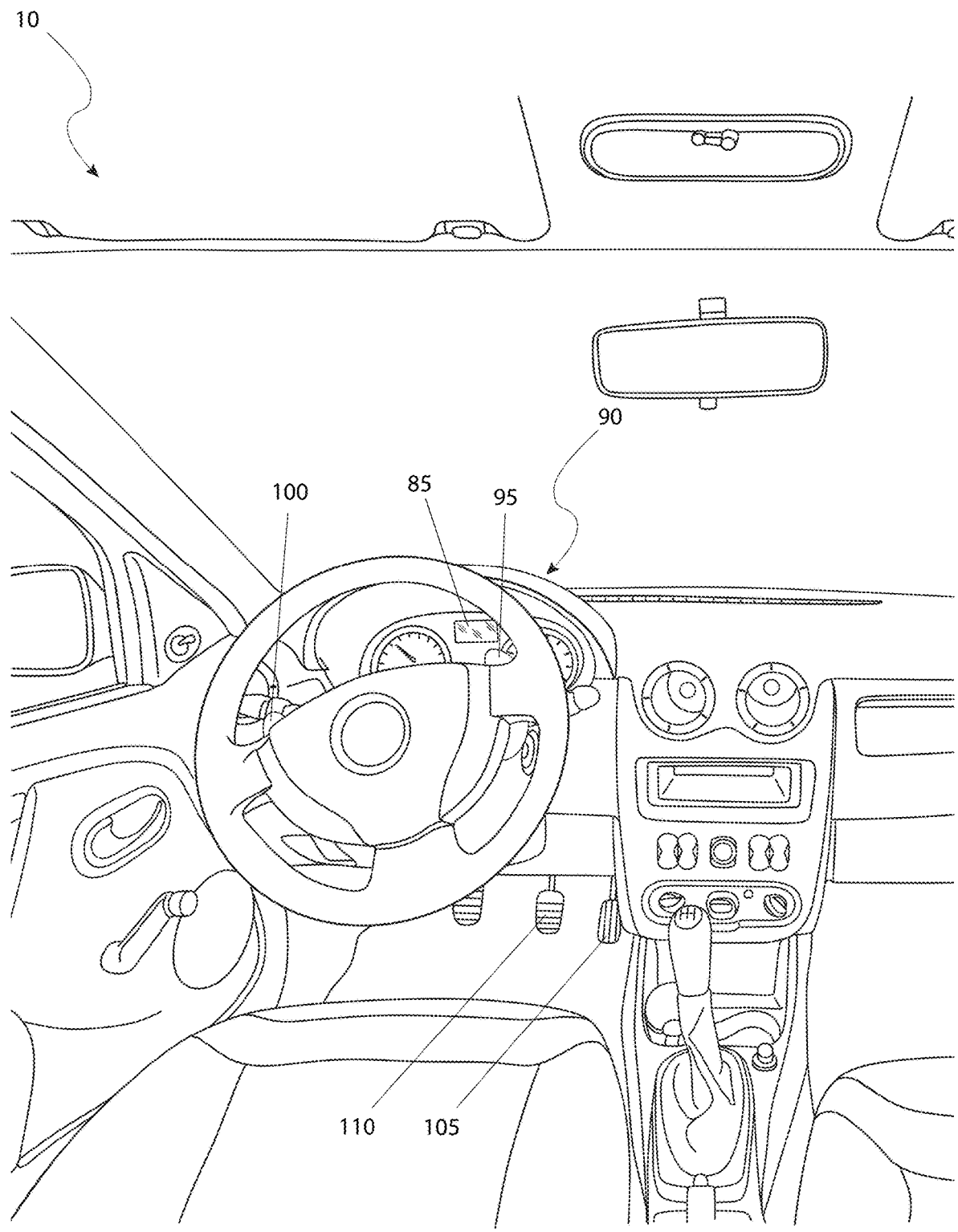
FIG. 2 is a front view of a dashboard 90, as used with the retrofit regenerative braking system 10, according to the preferred embodiment of the present invention; and, FIG. 3 is an electrical block diagram of the retrofit regenerative braking system 10, according to the preferred embodiment of the present invention.

Referring next to FIG. 2, a front view of a dashboard 90, as used with the system 10, according to the preferred embodiment of the present invention is depicted. The dashboard 90 as viewed is a typical configuration for a typical vehicle 15. Any specific attribute other than the generic descriptions below are not intended to be a limiting factor of the present invention. The paddle shift controller 80 includes a right shifter 95 and a left shifter 100. The left shifter 100 would be used to engage the system 10 into a regenerative braking mode, thus stopping the vehicle 15. Any energy captured during said braking mode would be used to recharge the battery pack 70 and/or supercapacitor 75 (both of which are as shown in FIG. 1). The right shifter 95 would be used to accelerate the vehicle 15 after a short delay. Both the right shifter 95 and left shifter 100 are of a highly sensitive variable speed button design, such that the more the shifter is pressed, the higher the amount of action is generated. The right shifter 95 would be used in conjunction with the accelerator pedal 105 to move the vehicle 15 forward. Likewise, the left shifter 100 would be used in conjunction with the brake pedal 110 to stop the vehicle. The visual indicator screen 85 is also located in a prominent location on the dashboard 90. The visual indicator screen 85 would display the charge condition of the battery pack 70 (as shown in FIG. 1). The visual indicator screen 85 would also depict engagement levels of the variable speed electric motor with regenerative braking 60, as well as the additional motor 62 if provided (as shown in FIG. 1). The visual indicator screen 85 could also be utilized by the user to customize the usage experience as desired. Customizable settings would include, but not be limited to the following:

Turning regenerative braking on and off (engaged once the right shifter 95 is released).
Switching between a manual mode and a synced-to-driver mode (would require a controller capable of interacting with the vehicle 15 computer.
Controlling the variable speed electric motor with regenerative braking 60, as well as the additional motor 62 if provided, by the accelerator pedal 105 and the brake pedal 110 of the vehicle 15 for better operating efficiency.

Figure 3:
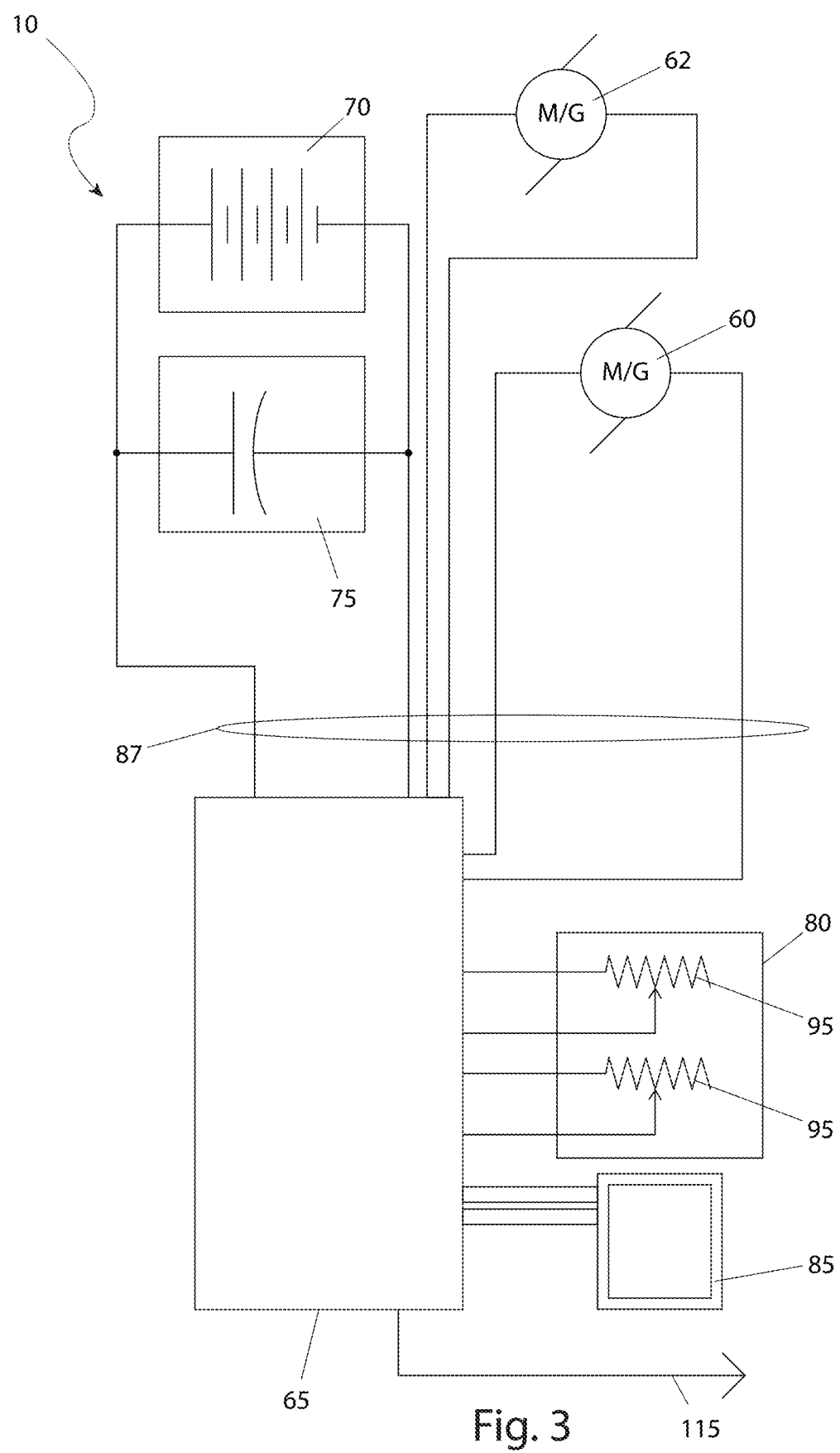

Referring to FIG. 3, an electrical block diagram of the system 10, according to the preferred embodiment of the present invention is shown. The paddle shift controller 80, consisting of the right shifter 95 and the left shifter 100 are located on the dashboard 90 (as shown in FIG. 2) along with the visual indicator screen 85. The visual indicator screen 85 serves as an override and an activation means as well. Once engaged, the left shifter 100 will control regenerative breaking sensitivity, by producing drag in the variable speed electric motor with regenerative braking 60, as well as the additional motor 62 if provided, as controlled by the electrical controller 65. The right shifter 95 will control power input to the variable speed electric motor with regenerative braking 60, as well as the additional motor 62 if provided, from the energy stored in the lithium polymer battery pack 70 and the supercapacitor 75. Power levels, as available in the battery pack 70 and the supercapacitor 75 will be visually represented on the visual indicator screen 85. A connection to the additional motor 62 (if utilized) in the same manner as the variable speed electric motor with regenerative braking 60. A connection to the vehicle computer 115 may be provided to allow for complete integration of the system 10 with the equipped vehicle 15. The various electrical connections are accomplished by wiring 87 as shown.

2. Operation of the Preferred Embodiment

Referring now to FIG. 1, a cutaway view of a retrofit regenerative braking system 10 installed on a vehicle 15, according to the preferred embodiment of the present invention is disclosed. The retrofit regenerative braking system (herein also described as the "system") 10, provides a method by which existing motor vehicles 15 can be equipped with an on-board system 10 that captures regenerative braking power and uses it to improve performance and efficiency. The system 10 can be adapted to any type of existing vehicle 15 (herein depicted as a frame for purposes of illustration), typically powered by an internal combustion engine 60, including but not limited to passenger vehicle, trucks, heavy haul transport trucks, recreational vehicles, emergency vehicles, construction vehicles, and the like. As such, the use of the system 10 on any particular type of vehicle 15 is not intended to be a limiting factor of the present invention.

A transmission 20 provides rotational energy in a conventional manner. The output of the transmission 20 is routed to a power input gearbox 25. The power input gearbox 25 is envisioned to be similar in design to an industrial grade (heavy duty) secondary four-by-four (4×4) power take off (PTO) gearbox specifically designed for the vehicle 15 and/or transmission 20 upon which it is used. In an alternate embodiment a PTO from a conventional transmission 20 could also be utilized. A passenger vehicle 15 would generally be smaller in physical size, while larger vehicle 15, such as heavy-haul vehicles would be larger in size. A first transmission output 30 is routed to a differential 35 and a drive axle 40 in a conventional manner. A second bi-directional transmission output 45 is then routed to a torque converter 50.

The torque converter 50 is similar to those found in an automatic transmission in that it would allow for a non-rigid coupling of the two (2) power sources to avoid damage and increase safety. The torque converter 50 is directly coupled to a variable speed electric motor with regenerative braking 60 such as a "Warp 11" with approximately one-hundred-pounds (135 lbs.). Other motor/generators with regenerative braking could also be used and as such, the use of any specific variable speed electric motor with regenerative braking 60 should not be interpreted as a limiting factor of the system 10. A bi-directional rotational power shaft 55 is routed from the variable speed electric motor with regenerative braking 60 to an additional motor 62 for instances where additional power is needed for larger applications such as a truck, an off-road construction vehicle, a high performance application, or the like. The inclusion or deletion of the additional motor 62 as well as the bi-directional rotational power shaft 55 is not intended to be a limiting factor of the system 10.

The electrical connection from the variable speed electric motor with regenerative braking 60, as well as the additional motor 62 if provided, is routed to an electrical controller 65. For the purposes of electrical power storage, power is routed in a parallel connection to a lithium polymer battery pack 70 and a supercapacitor 75. The battery pack 70 is envisioned to be made with the highest-grade batteries available, and with the largest capacity that can fit the physical space available. The supercapacitor 75 would also be made with the highest grade, state-of-the-art, capacitors with a larger instantaneous capacity of the battery pack 70 that would also fit the physical space available. Both the battery pack 70 and the supercapacitor 75 would be custom made to fit within the confines of the space available on the specific vehicle 15. The electrical controller 65 serves as a controller interface for the variable speed electric motor with regenerative braking 60, as well as the additional motor 62 if provided, the battery pack 70, the paddle shift controller 80, and a visual indicator screen 85. Both the paddle shift controller 80 and the visual indicator screen 85 will be located in the passenger compartment of the equipped vehicle 15 as will be shown herein below. The electrical controller 65 provides the following functionality via controlling:

Safety overrides.
Variable speed electric motor with regenerative braking 60, as well as the additional motor 62 if provided, variability.
Lock up engagement.
Battery levels and management.
Autopilot to allow trickle power output for a long period to use for better efficiency.
Synchronizing the variable speed electric motor with regenerative braking 60, as well as the additional motor 62 if provided, with an "rpm" sensor for engagement.
Start delays to avoid damage due to directional change.
Means of motor 60, as well as the additional motor 62 if provided, engagement to allow for synchronization with output of the first transmission output 30.

The above electrical connections are accomplished by wiring 87 as shown.

Referring next to FIG. 2, a front view of a dashboard 90, as used with the system 10, according to the preferred embodiment of the present invention is depicted. The dashboard 90 as viewed is a typical configuration for a typical vehicle 15. Any specific attribute other than the generic descriptions below are not intended to be a limiting factor of the present invention. The paddle shift controller 80 includes a right shifter 95 and a left shifter 100. The left shifter 100 would be used to engage the system 10 into a regenerative braking mode, thus stopping the vehicle 15. Any energy captured during said braking mode would be used to recharge the battery pack 70 and/or supercapacitor 75 (both of which are as shown in FIG. 1). The right shifter 95 would be used to accelerate the vehicle 15 after a short delay. Both the right shifter 95 and left shifter 100 are of a highly-sensitive variable speed button design, such that the more the shifter is pressed, the higher the amount of action is generated. The right shifter 95 would be used in conjunction with the accelerator pedal 105 to move the vehicle 15 forward. Likewise, the left shifter 100 would be used in conjunction with the brake pedal 110 to stop the vehicle. The visual indicator screen 85 is also located in a prominent location on the dashboard 90. The visual indicator screen 85 would display the charge condition of the battery pack 70 (as shown in FIG. 1). The visual indicator screen 85 would also depict engagement levels of the variable speed electric motor with regenerative braking 60, as well as the additional motor 62 if provided (as shown in FIG. 1). The visual indicator screen 85 could also be utilized by the user to customize the usage experience as desired. Customizable settings would include, but not be limited to the following:

Turning regenerative braking on and off (engaged once the right shifter 95 is released).

Switching between a manual mode and a synced-to-driver mode (would require a controller capable of interacting with the vehicle 15 computer.

Controlling the variable speed electric motor with regenerative braking 60, as well as the additional motor 62 if provided, by the accelerator pedal 105 and the brake pedal 110 of the vehicle 15 for better operating efficiency.

Referring to FIG. 3, an electrical block diagram of the system 10, according to the preferred embodiment of the present invention is shown. The paddle shift controller 80, consisting of the right shifter 95 and the left shifter 100 are located on the dashboard 90 (as shown in FIG. 2) along with the visual indicator screen 85. The visual indicator screen 85 serves as an override and an activation means as well. Once engaged, the left shifter 100 will control regenerative breaking sensitivity, by producing drag in the variable speed electric motor with regenerative braking 60, as well as the additional motor 62 if provided, as controlled by the electrical controller 65. The right shifter 95 will control power input to the variable speed electric motor with regenerative braking 60, as well as the additional motor 62 if provided, from the energy stored in the lithium polymer battery pack 70 and the supercapacitor 75. Power levels, as available in the battery pack 70 and the supercapacitor 75 will be visually represented on the visual indicator screen 85. A connection to the additional motor 62 (if utilized) in the same manner as the variable speed electric motor with regenerative braking 60. A connection to the vehicle computer 115 may be provided to allow for complete integration of the system 10 with the equipped vehicle 15. The various electrical connections are accomplished by wiring 87 as shown.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this patent application.

The invention claimed is:

1. An aftermarket hybrid conversion system for a vehicle having a drive shaft, comprising:
   a power input gearbox coupled to said drive shaft;
   a variable speed electric motor with regenerative braking capability coupled to said power input gearbox through a torque converter;
   an energy storage system comprising:
      a lithium polymer battery pack; and
      a supercapacitor connected in parallel with said battery pack;
   a paddle shift controller mounted on a steering wheel, comprising:
      a left paddle shifter for engaging regenerative braking; and
      a right paddle shifter for controlling electric motor assist;
   an electrical controller operatively connected to said electric motor, said energy storage system, and said paddle shift controller, said electrical controller configured to:
   manage power flow between said electric motor and said energy storage system;
   control regenerative braking sensitivity based on left paddle shifter position;
   control electric assist power based on right paddle shifter position; and
   implement safety overrides.

2. The system of claim 1, further comprising an additional motor coupled to said variable speed electric motor through a bi-directional rotational power shaft.

3. The system of claim 1, wherein said power input gearbox comprises:
   a first transmission output coupled to a differential; and
   a second bi-directional transmission output coupled to said torque converter.

4. The system of claim 1, wherein said torque converter provides non-rigid coupling between said power input gearbox and said variable speed electric motor.

5. The system of claim 1, further comprising a visual indicator screen configured to display:
   charge conditions of said battery pack and said supercapacitor; and
   engagement levels of said electric motor.

6. The system of claim 5, wherein said visual indicator screen provides user-customizable settings for:
   regenerative braking activation;
   manual or synchronized operation modes; and
   pedal control configuration.

7. The system of claim 1, wherein said electrical controller further provides:

variable motor speed control;
battery level management;
RPM synchronization for motor engagement; and
start delay implementation for directional changes.

8. A method of retrofitting a vehicle with hybrid capabilities, comprising:
coupling a power input gearbox to a vehicle drive shaft;
connecting a variable speed electric motor with regenerative braking capability to said power input gearbox through a torque converter;
installing an energy storage system comprising parallel-connected lithium polymer batteries and supercapacitors;
mounting paddle shifters on a steering wheel;
connecting an electrical controller between said electric motor, said energy storage system, and said paddle shifters; and
configuring said electrical controller to manage power flow and implement safety protocols.

9. The method of claim 8, further comprising coupling an additional motor to said variable speed electric motor through a bi-directional rotational power shaft.

10. The method of claim 8, further comprising installing a visual indicator screen configured to display system status and provide user controls.

11. An aftermarket hybrid conversion kit for a vehicle, comprising:
a power input gearbox configured for connection to a vehicle drive shaft;
an electric motor assembly comprising:
a variable speed electric motor with regenerative braking capability; and
a torque converter for coupling said motor to said power input gearbox;
an energy storage assembly comprising:
a lithium polymer battery pack;
a supercapacitor bank; and
parallel connection circuitry;
a control assembly comprising:
steering wheel-mounted paddle shifters;
an electrical controller; and
a visual indicator screen; and
installation hardware for mounting said assemblies to said vehicle.

12. The kit of claim 11, further comprising an additional motor and a bi-directional rotational power shaft.

13. The kit of claim 11, wherein said electrical controller is pre-configured with safety protocols and power management algorithms.

14. The kit of claim 11, wherein said paddle shifters comprise variable-position sensors for proportional control of regenerative braking and power assist functions.

15. The kit of claim 11, wherein said energy storage assembly is configurable to fit within available space in different vehicle types.

16. The system of claim 1, wherein said variable speed electric motor is sized to provide supplemental torque substantially equivalent to an original engine output of said vehicle.

17. The system of claim 1, wherein said electrical controller is further configured to charge said lithium polymer battery pack using said vehicle's alternator during normal operation.

18. The method of claim 8, further comprising configuring said electrical controller to:
control regenerative braking sensitivity proportionally to left paddle shifter position; and
control electric assist power proportionally to right paddle shifter position.

19. The kit of claim 11, wherein said power input gearbox comprises a power take-off unit specifically designed for said vehicle.

20. The system of claim 1, wherein said system is adaptable for installation in vehicles including passenger vehicles, heavy haul trucks, recreational vehicles, emergency vehicles, and construction vehicles.

* * * * *